Jan. 26, 1954  F. CUNNINGHAM, JR  2,667,063
SUPERSONIC INSPECTION DEVICE
Filed Jan. 8, 1946  2 Sheets-Sheet 1

INVENTOR
FREDERIC CUNNINGHAM JR.
BY *M.C.Hayes*
ATTORNEY

Patented Jan. 26, 1954

2,667,063

UNITED STATES PATENT OFFICE 2,667,063

SUPERSONIC INSPECTION DEVICE

Frederic Cunningham, Jr.,
Springfield Center, N. Y.

Application January 8, 1946, Serial No. 639,893

5 Claims. (Cl. 73—67)

This invention relates to apparatus for determining the properties of materials, and more particularly to improvements in superconic, non-destrictive methods and means for testing dimensions, internal condition and other physical characteristics of bodies of material.

Heretofore, supersonic testing devices have been dependent upon the transmission, reception or reverberation of pulses of energy in material to be tested, and have been complicated and expensive due to the inherent requirement of the means for forming and transmitting energy pulses of suitable amplitude, shape and duration.

Accordingly it is a general object of the present invention to provide a material testing device substantially eliminating the aforementioned disadvantages of prior art apparatus by utilizing a continuous or non-pulsed supersonic wave.

Another object of the present invention is to provide a material testing device utilizing frequency modulated supersonic waves.

A further object of the present invention is to provide a supersonic material testing device which may be made to yield substantially quantitative data concerning comparative dimensions and internal condition of two bodies of material.

These and other objects will be apparent from the following specification when taken with the accompanying drawing in which.

It is generally known to the art that waves simultaneously projected in phase through two bodies of material having different dimensions or different composition are unlikely to emerge in phase. However, this phenomenon, when used as a basis for material testing or comparison may not be depended upon to include all possible conditions, because a unique condition may arise where waves do emerge in phase from such projection.

In accordance with the principles of the present invention, the possibility of obtaining ambiguous results is substantially eliminated. This is accomplished by projecting supersonic waves at a plurality of frequencies through two bodies of material, whereby no possibility exists of an accidental or unique condition where a discrepancy in dimension or composition between the two bodies of material will not manifest itself in terms of phase displacement between the two waves after they emerge from such projection. A simple method of insuring projection of supersonic waves at a plurality of frequencies is to provide means whereby the generator used for projection of supersonic waves may be frequency modulated.

Figure 1:
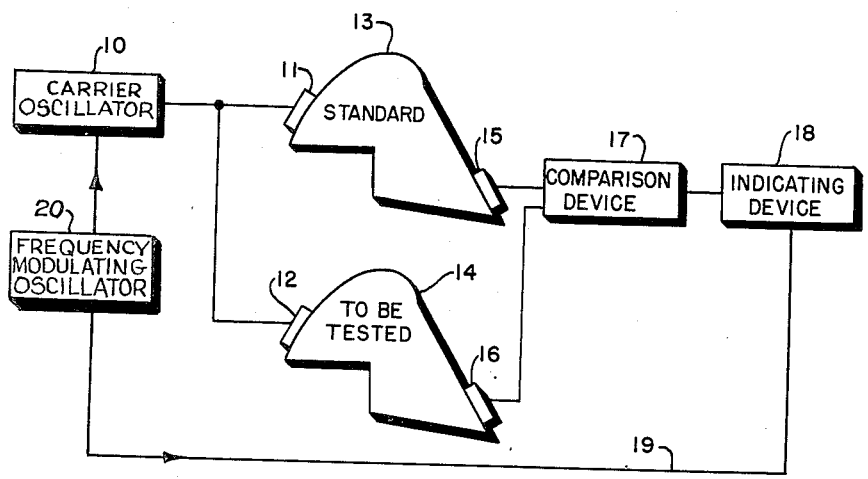
Fig. 1 represents one possible embodiment of the present invention.

Referring to the drawing, and more particularly to Fig. 1, block 10 represents a carrier oscillator for producing a continuous wave signal having a frequency in the supersonic range. Frequency modulation oscillator 20 produces a modulating signal having a frequency considerably lower than the frequency of oscillator 10. The output of oscillator 20 is applied to oscillator 10 in a conventional manner to cause oscillator 10 to produce a continuous carrier frequency varying from a mean or center frequency at the frequency of oscillator 20. Thus, the frequency of oscillator 10 is cyclically scanned over a range of frequencies at a rate determined by the frequency of oscillator 20. The amplitude of the carrier wave is not significantly modulated; only the frequency is modulated in a cyclical manner. The output of oscillator 10 is impressed upon two similar, suitably broad-band, electromechanical transducers 11, 12 (such as crystals), which are respectively secured to a standard part 13 and a part to be tested 14. Transducers 11 and 12 convert the frequency modulated signals impressed thereon to supersonic compressional signals and project them through the standard and test parts, respectively. After the frequency modulated supersonic signals have passed through the standard and test parts, they are picked up by similar, suitably broad-band electromechanical transducers 15 and 16 which convert the compressional signals back to electrical signals having corresponding frequency variations and apply them to comparison device 17. For accurate testing, the input and output transducers must be similarly attached to both the standard and the part to be tested.

Figure 1A:
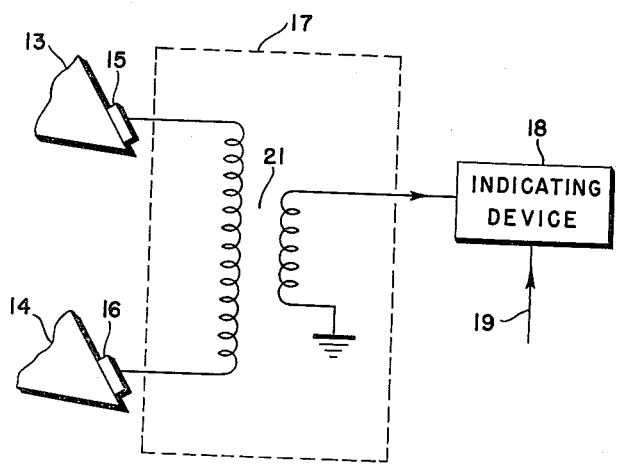
Fig. 1A is a schematic diagram of a possible circuit arrangement of the comparison device of Fig. 1.

Comparison device 17 may take a variety of forms, a particular function thereof being that of subtracting the signal produced by one of the output transducers from the signal output of the other. If the standard and test parts are identical, there will be no output from the comparison device; but if there are discrepancies in the test part, a signal having components dependent upon such irregularities will be produced by the subtraction. The comparison device 17 may, therefore, consist merely in a simple transformer 21 having a primary winding connected between transducers 15 and 16, and a secondary winding connected between indicating device 18 and ground as shown in Fig. 1A. Identical signals coupled to opposite ends of the primary winding will produce a zero output in the secondary, whereas differences in the signals from the two transducers, produced by discrepancies in the test part, will produce a signal for application to the indicating device.

Comparison device 17 may also take the form of the conventional balanced detector generally disclosed in Fig. 2, and to which detailed reference will be made hereinafter.

The output of comparison device 17 is applied to indicating device 18 which preferably takes the form of an oscilloscope and associated amplifiers. The sweep of the oscilloscope is synchronized with the output of oscillator 20 through connection 19, whereby the oscilloscope is adapted to indicate the instantaneous carrier frequency at which discrepancies are most apparent.

A method of testing using the embodiment of the invention shown in Fig. 1 may include the following steps. Carefully place a standard body 13 between transducers 11 and 15. Similarly place a body 14 to be tested between transducers 12 and 16. Simultaneously project frequency modulated supersonic continuous waves thru the bodies. If the bodies are identical, comparison device 17 will cause no indication in indicating device 18 at any frequency used. If discrepancies exist between the standard body and body to be tested, comparison device 17 will cause indication device 18 to disclose the existence of these discrepancies at some frequency being used. Generally the larger the discrepancies the greater the indication. If slight discrepancies exist, an indication will be apparent at higher frequencies and not be noticeable at low frequencies. Hence by suitable calibration with respect to magnitude of indication and frequency at which indication occurs, the invention may be made to yield substantially quantitative data concerning dimensions, internal condition, crystalline properties or internal defects of material bodies, without necessity for destroying the bodies being tested.

Figure 2:
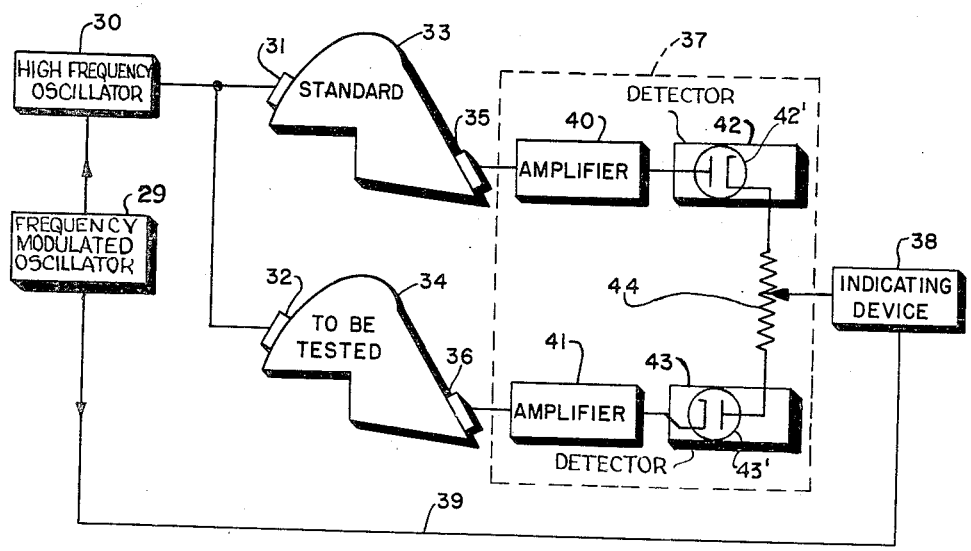
Fig. 2 represents another possible embodiment of the present invention.

Fig. 2 illustrates a second embodiment of the invention and is similar to that disclosed in Fig. 1 except that the nature of the signal applied to the part to be tested is somewhat different. The use of a different type of input signal imposes somewhat different requirements on the comparison device, as will be apparent hereinafter. In the drawing, block 30 represents a high frequency oscillator for producing a continuous wave signal having a frequency in the supersonic range. Frequency modulated oscillator 29, which corresponds to the combination of oscillators 10 and 20 of Fig. 1, produces a continuous carrier frequency varying cyclically from a mean or a center frequency at a relatively low rate. The output of oscillator 29 is superimposed as modulation on the higher frequency output of oscillator 30 to produce a complex frequency modulated signal. The output of oscillator 30 is impressed upon two similar, suitably broad-band electromechanical transducers 31 and 32 which are respectively secured to corresponding points on standard part 33 and a part to be tested 34. As in the circuit of Fig. 1, transducers 31 and 32 convert the frequency modulated signals impressed thereon to supersonic compressional signals and projects them through the standard and test parts. After the frequency modulated compressional signals have passed through the parts, they are picked up by transducers 35 and 36 which convert the compressional signals back to electrical signals and apply them to comparison device 37. Comparison device 37 includes a pair of balanced amplifiers 40 and 41, the outputs of which are applied to detectors 42 and 43, respectively. The detectors preferably comprise oppositely connected diodes 42' and 43' which produce output signals of opposite polarity. These output signals are combined in a balancing circuit which may be in the form of a common load resistor 44 having a center tap output connection. If the outputs of transducers 35 and 36 are identical, then the detector outputs will be of equal amplitude and opposite polarity and no signal will be applied to the indicating device 38 which, as in the circuit of Fig. 1, preferably comprises an oscilloscope. If the two outputs are of different phase and/or amplitude, there will result an output whose amplitude and polarity depend upon which of the original signals is the larger. The sweep of the oscilloscope is synchronized with the scanning frequency of oscillator 21 through connection 39. The input and output crystals of the standard and test parts are similarly attached to insure that differences in the output signals, if any, are due to structural discrepancies in the part being tested and not because of the point of attachment of the transducers to the two parts.

Because of the nature of the modulation used in the embodiment of Fig. 2, the transducers, although they must have broad-band characteristics, are operable at a relatively high frequency and thus has the advantage over the circuit of Fig. 1, which requires transducers operable at a comparatively low frequency. Since low frequency transducers are difficult to obtain, the circuit of Fig. 2 therefore has certain practical advantages. It will be apparent, however, that in the circuit of Fig. 2 amplifiers 40 and 41 must be accurately matched to provide identical gain, and detectors 42 and 43 must be accurately balanced to insure proper comparison of the output signals from transducers 35 and 36.

Methods of testing and interpretation of test results are essentially the same for the embodiments shown in Figs. 1 and 2.

The words "frequency modulated" as used in the present specification are intended to indicate a frequency which is being cyclically varied over a range of frequencies. This variation may be sinusoidal or in some scanning or sweeping form.

The comparison device of Fig. 1, in addition to the possible arrangement illustrated in Fig. 1A, may be an amplifier which is sensitive to change in its input voltages with respect to phase or amplitude or both phase and amplitude. It is preferably of the type which yields zero output if two input signals thereto are in identical phase and amplitude relationship, and which yields an increasing output as the two input signals differ in phase and amplitude.

The embodiments shown in Figs 1 and 2 illustrate testing methods whereby a standard body is compared with a single body to be tested. It should be apparent that the identical idea of this invention may be used for simultaneously testing more than one body against a standard merely by addition of further transducers, comparing devices and indicating devices. Hence the invention described in the present specification need not be limited to the details shown, which are considered to be illustrative of forms the invention may take.

What is claimed is:

1. Apparatus for inspecting and measuring a solid part, comprising means for generating a frequency modulated, continuous wave signal having a frequency in the supersonic range, means for simultaneously impressing said signal on a selected point on said part and on a corresponding point on a standard part, means for receiving at a second point on said part a first signal resulting from the transmission of said frequency modulated signal through said part, means for receiving at a point on said standard part corresponding to said second point on said part, a second signal resulting from the transmission of said frequency modulated signal through said standard part, and means for comparing said first and second signals, said last-mentioned means providing a signal indicative of the difference, if any, between the amplitude and phase of said first and said second signals.

2. Apparatus for inspecting and measuring a solid part, comprising means for generating a continuous, supersonic wave cyclically varying through a range of frequencies, first and second electromechanical transducers respectively mounted on a selected point on said part and on a corresponding point on a standard part, said first and second transducers being coupled to said generating means and adapted to convert electrical signals from said generating means into compressional waves within said test part and said standard part, third and fourth electromechanical transducers respectively mounted on a selected point on said test part and on a corresponding point on said standard part for receiving said compressional waves and converting them into corresponding electrical signals, a comparison device coupled to said third and fourth transducers for comparing the electrical signals produced by said third and fourth transducers to provide a signal indicative of the differences, if any, between the amplitude and phase of the signals produced by said third and fourth transducers, and an indicator coupled to said comparison device and arranged visually to indicate said differences.

3. Apparatus for inspecting the dimensions and internal properties of a solid part, comprising a source of continuous waves, means for cyclically varying the frequency of said source over a range of supersonic frequencies, first and second electromechanical transducers respectively mounted on a point on said part and on a corresponding point on a standard part, said first and second transducers being coupled to said source of waves and adapted to convert said frequency modulated signal into corresponding compressional waves within said part and said standard part, third and fourth electromechanical transducers respectively mounted on a selected point on said test part and on a corresponding point on said standard part for receiving said compressional waves and converting them into corresponding electrical signals, a comparison device coupled to said third and fourth transducers for comparing the electrical signals produced by said third and fourth transducers, and an indicator coupled to said comparison device and synchronized with said means for cyclically varying the frequency of said source for displaying the difference between the signal outputs of said third and fourth transducers, thereby to indicate discrepancies between said part and said standard part and the frequencies at which the discrepancies occur.

4. Apparatus for inspecting the dimensions and internal properties of a solid test part comprising a source of continuous waves, means for cyclically varying the frequency of said source over a range of supersonic frequencies, first and second electromechanical transducers respectively mounted on a point on said test part and on a corresponding point on a standard part, said first and second transducers being coupled to said source of waves and adapted to convert said frequency modulated signal into compressional waves within said test part and said standard part, third and fourth electromechanical transducers respectively mounted on a selected point on said test part and on a corresponding point on said standard part for receiving said compressional waves and converting them into corresponding electrical signals, a comparison device comprising a transformer having a primary and a secondary coil, and an indicator, said third and fourth transducers being coupled to said primary coil, said indicator being coupled to said secondary coil, whereby said comparison device compares the electrical signals produced by said third and fourth transducers and produces a signal indicative of the differences, if any, between the amplitude and phase of the signals produced by said third and fourth transducers, and said signal is applied to said indicator for indication of said differences.

5. Apparatus for inspecting the dimensions and internal properties of a solid test part comprising a source of continuous waves, means for cyclically varying the frequency of said source over a range of supersonic frequencies, first and second electromechanical transducers respectively mounted on a point on said test part and on a corresponding point on a standard part, said first and second transducers being coupled to said source of waves and adapted to convert said frequency modulated signal into compressional waves within said test part and said standard part, third and fourth electromechanical transducers respectively mounted on a selected point on said test part and on a corresponding point on said standard part for receiving said compressional waves and converting them into corresponding electrical signals, an indicating device, and a comparison device, said comparison device comprising first and second detectors and a balancing circuit, said balancing circuit being coupled to said third and fourth transducers by said first and second detectors respectively, said detectors being oppositely connected to produce signals of opposite polarity, said balancing circuit further being coupled to said indicator whereby the differences, if any, between the amplitude and phase of the signals produced by said third and fourth transducers is applied to and indicated by said indicator.

FREDERIC CUNNINGHAM, Jr.

References Cited in the file of this patent

UNITED STATES PATENTS

| Number | Name | Date |
|---|---|---|
| 2,010,189 | Hallowell | Aug. 6, 1935 |
| 2,280,226 | Firestone | Apr. 21, 1942 |
| 2,345,679 | Linse | Apr. 4, 1944 |
| 2,418,538 | Yetter | Apr. 8, 1947 |
| 2,431,234 | Rassweiler et al. | Nov. 18, 1947 |

FOREIGN PATENTS

| Number | Country | Date |
|---|---|---|
| 881,644 | France | Jan. 28, 1943 |
| 899,646 | France | Aug. 28, 1944 |